Sept. 17, 1940.           H. S. JANDUS ET AL           2,215,002
                          BUMPER GUARD STRUCTURE
                      Filed Aug. 5, 1939        2 Sheets-Sheet 1

Inventors
HERBERT S. JANDUS
HUGH BUCHANAN

Sept. 17, 1940.  H. S. JANDUS ET AL  2,215,002
BUMPER GUARD STRUCTURE
Filed Aug. 5, 1939  2 Sheets-Sheet 2
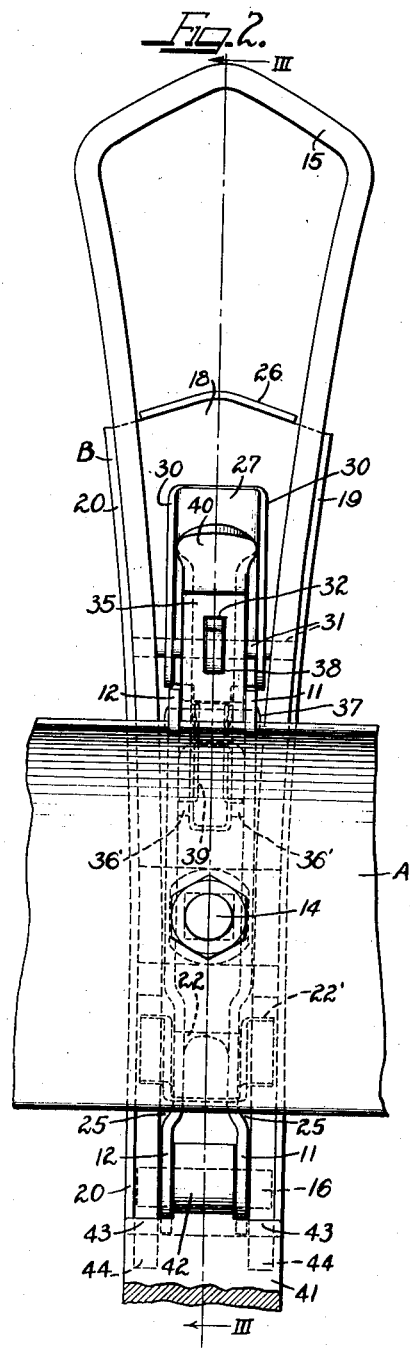
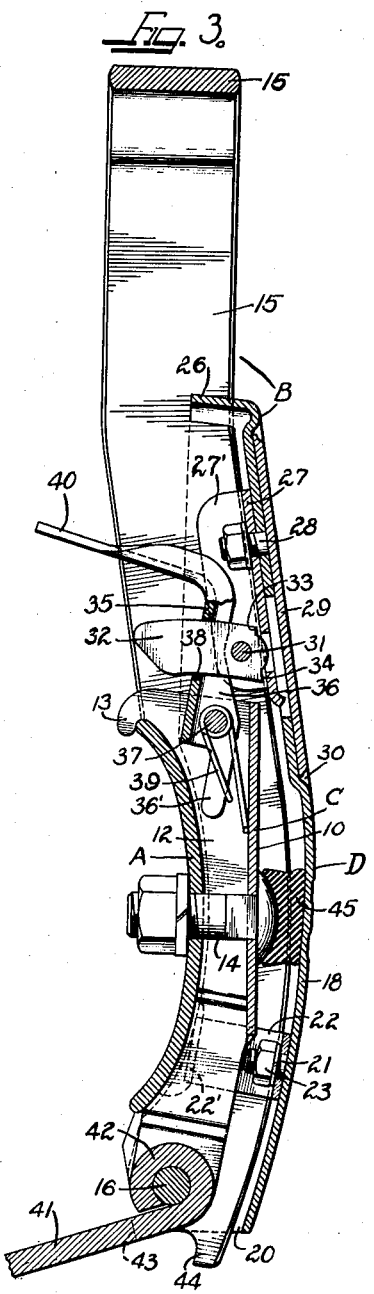
INVENTORS
HERBERT S. JANDUS
HUGH BUCHANAN Patented Sept. 17, 1940

2,215,002

UNITED STATES PATENT OFFICE 2,215,002

BUMPER GUARD STRUCTURE

Herbert S. Jandus and Hugh Buchanan, Detroit, Mich., assignors to Houdaille-Hershey Corporation, Detroit, Mich., a corporation of Michigan Application August 5, 1939, Serial No. 288,508

8 Claims. (Cl. 293—55)

This invention relates to automobile bumper guard structure and particularly to the type of guard structure in which the guard body may be swung away from the bumper bar to permit access to automobile parts as, for example, to permit opening of the door of the baggage compartment at the rear of an automobile. The invention may be considered as covering a number of improvements in structure and operation over the guard structure disclosed in our copending application Serial No. 224,024, filed August 10, 1938.

More in detail, an important object of the invention is to produce a stronger guard structure capable of resisting heavy bumps or blows.

A further object is to provide improved latching mechanism involving intergripping latching elements which will automatically engage and interlock when the guard body is sprung into service position and which may be readily released for downward swing of the guard structure.

A further object is to build a guard structure of simple metal stampings which are shaped and assembled for maximum bump resistance but are comparatively of light weight.

This invention also embodies other features of construction, arrangement and operation, and all the various features are included in the structure disclosed on the drawings, in which:

Figure 1 is a front elevation of the guard structure mounted on a bumper impact bar;

Figure 2 is an enlarged rear elevation;

Figure 3 is a section on plane III—III of Figure 2 showing the guard structure in service position;

Figure 4 is a sectional view like Figure 3 but showing the guard body released for downward swing.

The guard structure shown comprises a bracket or supporting structure C, and a body structure B. The bracket structure is of generally U-shaped cross section and comprises the back wall 10 and the side walls or flanges 11 and 12, the side walls being recessed at their outer edges so as to fit the convex curvature of the bumper impact bar A, the side walls at their upper outer corners being hook shaped to surround the upper edge of the impact bar to more securely hold the bracket structure against vertical displacement. As shown, a bolt 14 extends through the bracket back wall 10 and through the impact bar for rigidly securing the bracket structure to the impact bar.

The guard structure body B comprises the guard bar 15 which is of generally hairpin or U-shape and which may be readily formed from stock bar of material such as steel. Along their lower portions, the legs of the guard bar are spaced apart to receive between them the clamping structure C, a hinge or pivot pin 16 extending through the lower ends of the side walls 11 and 12 of the clamp structure and through the lower ends of the guard bar legs so that the guard bar is hinged to the clamp structure, the legs of the guard bar above the hinge connection being recessed as indicated at 17 for engagement with the convex front face of the impact bar A when the guard bar is in service position as indicated on Figure 3.

Secured to the guard bar 15 is a cover structure D which is of generally U-shape cross section and which comprises the front wall 18 and the side walls or flanges 19 and 20, this cover structure receiving the lower portion of the guard bar with its side walls 19 and 20 in intimate engagement with the legs of the guard bar. A distance above its lower end, the front wall 18 has a stud 21 extending rearwardly therefrom and secured thereto as by welding. A U-shaped strap or clip 22 has its yoke part apertured to receive the stud and to be secured to the wall 18 by the nut 23 engaging the threaded end of the stud. The legs of the clip extend along the inner sides of the legs of the guard bar 15 and the ends 22' of the clip legs are deflected laterally outwardly into recesses 24 cut in the front edges of the guard bar legs so that the clip serves to secure the lower end of the cover structure rigidly to the guard bar. As best shown on Figure 2, the side walls 11 and 12 of the clamp structure C are deflected inwardly to provide clearance passages 25 for the clip legs when the guard structure B is swung into service position.

The lower ends of the side walls 19 and 20 of the cover structure extend sufficiently forwardly to cover the ends of the hinge pin 16 so as to prevent access to the hinge pin. Above the hinge connection, the front ends of the side walls of the cover structure are recessed to follow the curvature of the impact bar A when the guard structure is in service position as shown in Figure 3.

At its upper end the cover structure 18 has the top wall 26 which is notched to receive the legs of the guard bar 15. Below the upper end of the cover structure, a bracket fitting 27 is secured against the inner side of the wall 18 by a bolt 28 whose head may be in the form of a name or ornament plate 29 seated in the recess 30 formed by deflecting the wall 18. The bracket 27 is of U-shape cross section and has the side walls or flanges 27' through the lower ends of which extends a pin 31 which also extends through the legs of the guard bar 15, as shown on Figure 2, this pin thus serving to secure the upper portion of the cover structure 18 to the guard bar. The pin is held against axial displacement by the side walls 19 and 20 of the cover structure. A locking or latching element in the form of a sector 32 is secured to the pin at the middle point thereof, the pin being free to turn in the walls of the bracket so that the sector 32 may swing vertically. Such vertical swing is limited by engagement with the bracket 27 of shoulders 33 and 34 on the sector.

The sector member 32 forms a latching tongue for cooperation with the latching element in the form of a link 35 mounted on the bracket structure C. The link extends downwardly between the side walls 11 and 12 of the bracket structure and has the side walls or flanges 36 apertured to receive a pivot pin 37 supported by the bracket structure. The link has the rectangular passageway 38 therethrough for receiving the sector or tongue 32 of the guard body structure when the guard body structure is swung into service position as shown on Figure 3. A spring 39 is mounted on the pin 37 with one leg abutting the back wall 10 of the bracket structure with its other leg engaging with the arms 36' extending downwardly from the flanges 36 of the link, the spring tending to swing and hold the link in inclined position whereby to frictionally engage the edges of its passageway 38 with the tongue 32 for intergripping engagement, as shown on Figure 3, whereby to latch or lock the guard body structure B against swinging movement away from the bracket structure C. The guard body structure can be readily released for downward swing by manually swinging the link rearwardly so as to release the intergripping connection thereof with the tongue 32. In order to facilitate such manual swing of the link, it is provided with a rearward extension 40 which may be readily engaged by the hand for downward pressure to release and swing the link. When the link is thus released, the guard structure body B may be swung away from the bracket structure C and downwardly out of the way of the automobile part to which access is desired, as for example the door of the baggage or storage compartment. When the guard is swung and the tongue 32 is drawn from the link 35, the spring 39 will swing the link to its extreme position with its ends 36' abutting the impact bar. When the guard body structure B is swung back into service position the tongue 32 will re-engage in the link passage 38, the end of the tongue being tapered so that it may readily be guided into the passageway. The tongue may readily move through the passageway to the clamping position as any frictional engagement of the tongue with the link will swing the link rearwardly. However when the guard structure body B has reached its service position against the impact bar A, the spring will re-establish the gripping connection of the link with the tongue and then any outward pressure against the guard structure body will tend to swing the link outwardly to increase the intergripping engagement and the guard body structure will then be securely latched in service position and can be released only by manual swing of the link inwardly to release the intergripping connection.

In order to protect the bumper impact bar A against undue torsional strain when the guard structure is struck by another vehicle, a brace bar 41 may be provided between the lower end of the bracket structure C and the vehicle chassis. The bar may be of reduced width at its end and bent to form an eye 42 for receiving the hinge pin 16 between the side walls of the bracket structure. The shoulders 43 on the bar will then serve as abutments for the projections 44 at the lower ends of the side walls of the guard bar 15 for limiting the downward swing of the guard body structure B.

A rubber block or pad 45 may be secured to the inside of the wall 18 of the cover structure D for engaging with the head of the bolt 14 to be compressed when the guard structure is in its service position and to hold the various parts against rattling.

In our improved guard structure, the guard bar 15 is of heavier material so as to take up the strain of bumps or blows, while the cover structure 18 is comparatively light and serves to support part of the latching mechanism. All of the parts of the structure can be economically stamped or formed from stock material, and the entire structure is comparatively light yet highly resistant to blows and bumps.

We have shown a practical and efficient embodiment of the features of our invention, but we do not desire to be limited to the exact construction and arrangement shown and described as changes and modifications may be made without departing from the scope of the invention.

We claim as our invention:

1. A bumper guard structure comprising a supporting bracket attachable to the impact bar of an automobile bumper, a guard body comprising spaced apart flat guard bars arranged in a plane at right angles to the impact bar at opposite sides of said bracket and hinged at their lower ends to the lower end of said bracket for swing into or out of service position relative to the impact bar, a cover structure receiving and secured to said bars, a latching tongue extending from said cover structure between said bars, and a latching link on said bracket adapted for interlocking connection with said tongue for locking said guard bars in service position.

2. A bumper guard structure comprising a supporting bracket attachable to the impact bar of an automobile bumper, a guard element comprising spaced apart substantially flat bars hinged to the bracket for swing in a vertical position to extend above the bracket or to be swung downwardly and being in planes at right angles to the impact bars on which the bracket is mounted, a cover structure secured to said bars to extend in front and along the sides thereof, a latching tongue extending from said cover structure, and a latch member on said bracket adapted to receive and to interlock with said tongue when said guard member is swung into service position and to latch said guard member in service position.

3. A bumper guard structure comprising a supporting bracket attachable to the impact bar of an automobile bumper structure, a guard member of inverted U-shape having its legs hinged at their lower ends to the lower end of said bracket and with said legs spaced apart to receive said bracket when said guard element is in its upper or service position, and a cover structure for said guard member secured thereto to swing therewith, a latch tongue extending from said cover structure, and a latch link on said bracket adapted to receive and interlock with said latch tongue when said guard member is swung to its upper or service position.

4. A guard structure of the class described comprising a bracket of U-shape cross section attachable to the impact bar of an automobile bumper and having the ends of its side walls shaped to fit the impact bar, a guard bar of inverted U-shape having its legs spaced apart to receive said bracket and pivoted at their lower ends to the bracket for swing of the guard element away from the bracket, a latch tongue extending from the guard element, and a latch element pivoted within said bracket and extending upwardly therefrom and adapted to receive and interlock with said tongue when said guard element is swung into its upper or service position whereby to lock said guard element.

5. A guard structure of the type comprising a bracket of U-shape cross section attachable to a bumper bar with the front edges of its legs in engagement therewith, a guard element in the form of a flat bar bent to substantially hairpin shape with its legs spaced apart to extend at either side of said bracket and hinged at their lower ends to the bracket for swing of the guard element away from the bracket, a cover structure secured to said guard element to extend across the front edges of said legs and along the sides thereof, latching elements pivoted to and extending from said cover structure and said bracket respectively, means adapting said latching elements for intergripping connection for locking said guard element in vertical service position, and spring means releasable by movement of one of said elements tending to hold said links in intergripping engagement.

6. A guard structure of the class described comprising a bracket attachable against the impact side of the impact bar of an automobile bumper, a guard element comprised of substantially parallel flat bars in planes at right angles to the plane of said bracket and spaced apart to extend outside of said bracket along opposite sides thereof and hinged at their lower ends to the bracket, a cover structure secured to said legs to extend across the front edges thereof, a latch tongue pivoted to and extending from said cover structure above the bracket, and a latching element pivoted on the bracket and adapted for intergripping engagement with said tongue, and spring means tending to hold said latching element to maintain such intergripping connection whereby said guard element will be locked in service position, manual swing of said latching element releasing the intergripping connection for swing of the guard element away from the bracket.

7. A bumper guard structure comprising a bracket attachable to the bumper of an automobile, a guard structure hinged at its lower end to said bracket for swing against the bumper to service position or for swing away from the bumper, latching elements pivoted respectively on said bracket and said guard structure and disconnected from each other when said guard structure is swung away from the bumper, and means adapting said latching elements to automatically enter into frictional intergripping engagement when said guard structure is swung to its service position.

8. An automobile bumper guard comprising a bracket structure attachable to a bumper bar, a guard in the form of a relatively heavy flat metal bar bent to substantially hairpin shape with its legs in parallel planes at right angles to the bumper bar and being hinged at their lower ends to the bracket for upward swing of the bar into service position or for downward swing thereof away from the bumper bar, a comparatively light cover structure for the lower ends of said legs, and cooperable locking elements on said bracket and cover structures for locking said guard in its upper or service position.

HERBERT S. JANDUS.
HUGH BUCHANAN.